(12) United States Patent
Lai et al.

(10) Patent No.: US 7,602,151 B2
(45) Date of Patent: Oct. 13, 2009

(54) CHARGER WITH OUTPUT VOLTAGE COMPENSATION

(75) Inventors: Yu-Chi Lai, Taoyuan (TW); Sheng-Fa Chi, Taoyuan (TW)

(73) Assignee: Asian Power Devices Inc. (TW)

( * ) Notice: Subject to any disclaimer, the term of this patent is extended or adjusted under 35 U.S.C. 154(b) by 448 days.

(21) Appl. No.: 11/593,545

(22) Filed: Nov. 7, 2006

(65) Prior Publication Data

US 2008/0106233 A1    May 8, 2008

(51) Int. Cl.
*H02J 7/04* (2006.01)
*H02J 7/16* (2006.01)
*H02J 7/06* (2006.01)
*H02J 7/24* (2006.01)

(52) U.S. Cl. .................. 320/145; 320/143; 320/162; 320/163

(58) Field of Classification Search .................. 320/139, 320/141–143, 145, 152, 160, 162–164
See application file for complete search history.

(56) References Cited

U.S. PATENT DOCUMENTS

| 5,847,543 | A | * | 12/1998 | Carroll | 320/125 |
| 7,005,914 | B2 | * | 2/2006 | Balakrishnan et al. | 327/589 |
| 7,453,239 | B2 | * | 11/2008 | Suzuki | 320/152 |
| 2005/0017706 | A1 | * | 1/2005 | Balakrishnan et al. | 323/320 |

* cited by examiner

*Primary Examiner*—Edward Tso
*Assistant Examiner*—Ramy Ramadan
(74) *Attorney, Agent, or Firm*—Hershkovitz & Associates, LLC; Abraham Hershkovitz

(57) ABSTRACT

A charger with output voltage compensation includes an AC/DC circuit, an output interface, a charge controller, and a compensator. The AC/DC circuit converts an AC source into a DC source. The voltage of the DC source is elevated by a transformer and used to charge a battery via the output interface. The charge controller can further increase the voltage of the output interface in order to accelerate battery charging. The compensator compensates the voltage wasted by the circuit. Therefore, the invention can overcome energy waste caused by the internal resistance in the circuit, achieving satisfactory charging effects.

7 Claims, 3 Drawing Sheets

//CHARGER WITH OUTPUT VOLTAGE COMPENSATION

BACKGROUND OF THE INVENTION

1. Field of the Invention

The invention relates to a charger and, in particular, to a charger that provides a compensating voltage for the voltage drop caused by the internal resistance of the circuit.

2. Description of Related Art

Most of the chargers on the market have the function of two-step charging. The users are allowed to choose whether to charge at a normal speed or a quicker speed. The quick charging refers to the charging scheme where the batteries on the chargers are provided with a larger current. In contrast, the normal charging provides a smaller current to the batteries.

As shown in FIG. 3, a usual charger uses an AC/DC circuit 100 to convert an AC current from an AC source 200 into a DC current. The DC current is sent into a transformer 300 for outputting a higher voltage. The elevated voltage is rectified and used to charge a battery 500 via an output interface 400. The output interface 400 is further connected with a detector 800, which detects whether the battery 500 is connected to the output interface 400. If the battery 500 is connected, then a feedback circuit 900 is used to make a controller 910 to increase the output voltage of the transformer 300, using a larger voltage to charge the battery 500.

In practice, any circuit has its internal resistance. When the elevated voltage output from the transformer 30 is transmitted to the output interface 40 via the circuit, some energy is wasted by the internal resistance. The actual energy output to the battery 50 is less than the output of the transformer 30, affecting the charging effect of the charger. Although the controller 91 can further increase the output voltage of the transformer 30 to compensate the energy wasted by the circuit, the energy consumed by the internal resistance is related to the magnitude of the charging voltage of the battery 50. Therefore, it is impossible to properly compensate the energy wasted by the circuit by increasing the output voltage of the transformer 30 by a fixed amount. This drawback of current chargers has to be overcome.

SUMMARY OF THE INVENTION

To solve the problem of lowered voltage output of the charger due to its internal resistance, an objective of the invention is to provide a charger with output voltage compensation. It can provide a compensating voltage to compensate the voltage drop caused by the internal resistance of the circuit.

The disclosed charger includes: an AC/DC circuit, a transformer, an output interface, a charging controller, and a compensator. The AC/DC circuit is connected to an AC source, and converts the AC current to a DC current. The transformer has a primary side and a secondary side. The primary side is connected to the AC/DC circuit to receive its output DC current. The secondary side detects the DC current and outputs an elevated voltage. The output interface is connected to the secondary side of the transformer for the connection of a battery. It outputs the elevated voltage to charge the battery. One end of the charging controller is connected to the primary side of the transformer. Its other end is connected to the secondary side of the transformer and the output interface. When a battery is connected to the output interface, the voltage is elevated to accelerate battery charging. One end of the compensator is connected to the secondary side of the transformer. Its other end is connected to the charging controller. When a battery is connected to the output interface, the elevated voltage is further increased by the charging controller to compensate for the energy wasted by the circuit.

Using the above technique, when a battery is connected to the output interface, the charging controller detects and increase the elevated voltage output by the secondary side of the transformer. In addition, the compensator and the charging controller further increase the output voltage on the secondary side of the transformer. This compensates for the energy wasted by the circuit, maintaining the charging effect of the charger.

DETAILED DESCRIPTION OF THE PREFERRED EMBODIMENT

Figure 1:
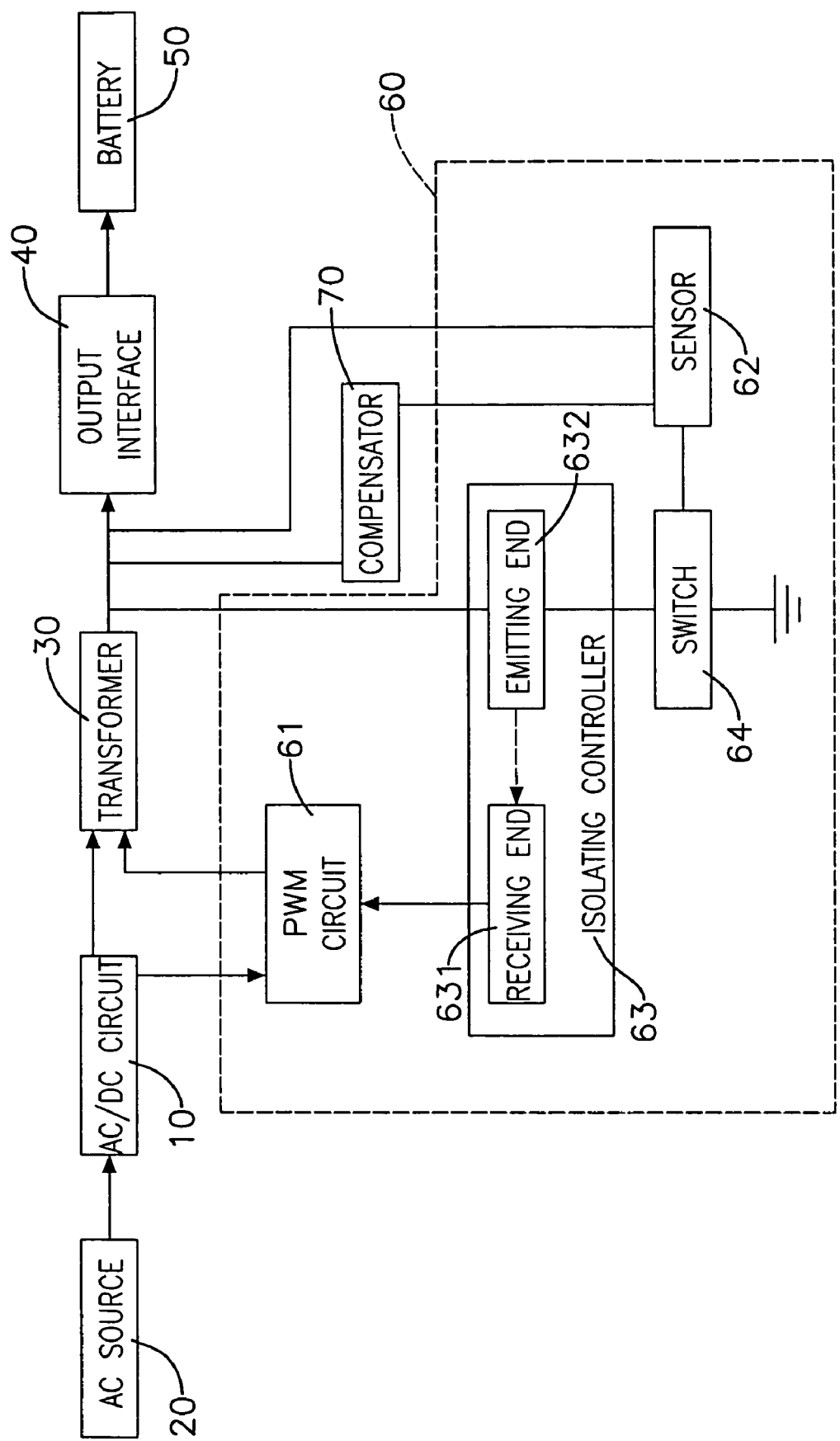
FIG. 1 is a functional block diagram of a preferred embodiment.

As shown in FIG. 1, a preferred embodiment of the charger with output voltage compensation according to the invention includes: an AC/DC circuit 10, a transformer 30, an output interface 40, a charging controller 60, and a compensator 70.

The AC/DC circuit 10 is connected to an AC source 20 and converts the AC current to a DC current.

The transformer 30 has a primary side (not shown) and a secondary side (not shown). The primary side is connected to the AC/DC circuit 10 to receive its output DC current. The secondary side detects the DC current and outputs an elevated voltage.

The output interface 40 is connected to the secondary side of the transformer 30 for the connection of a battery 50. It outputs the elevated voltage to charge the battery 50.

One end of the charging controller 60 is connected to the primary side of the transformer 30. Its other end is connected to the secondary side of the transformer 30 and the output interface 40. When the battery 50 is connected to the output interface 40, the voltage is elevated to accelerate battery charging.

One end of the compensator 70 is connected to the secondary side of the transformer 30. Its other end is connected to the charging controller 60. When the battery 50 is connected to the output interface 40, the elevated voltage is further increased by the charging controller 60 to compensate for the energy wasted by the circuit.

Figure 2:
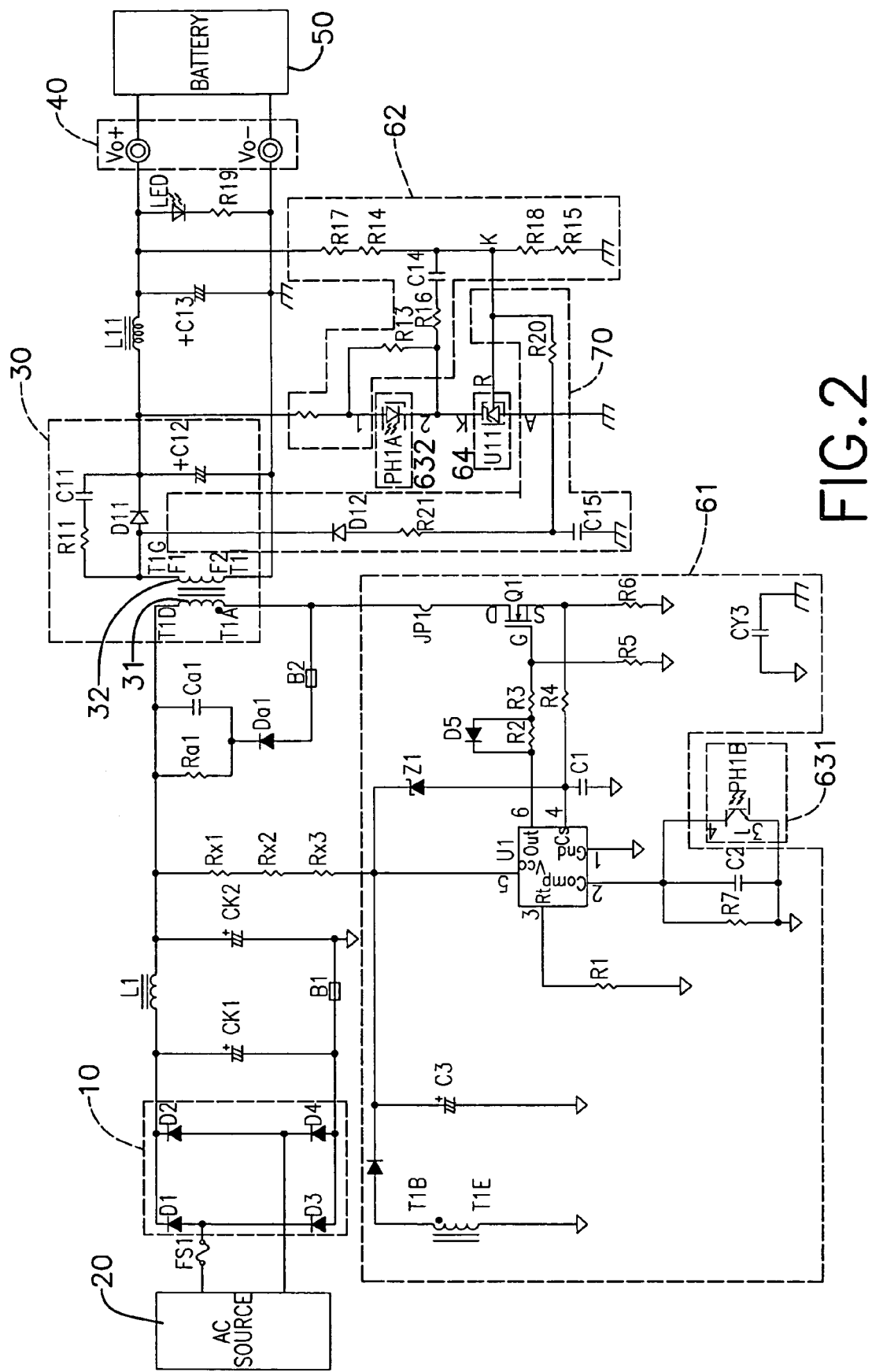
FIG. 2 is a circuit diagram of the preferred embodiment.
Figure 3:
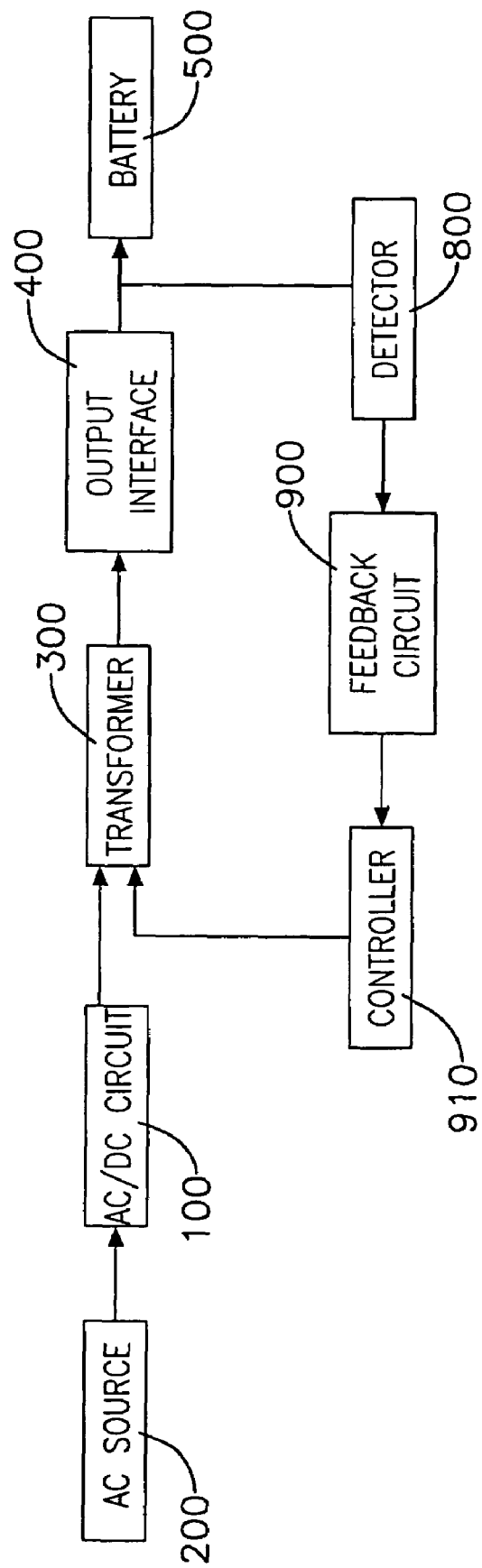
FIG. 3 is a functional block diagram of a conventional charger.

The following paragraphs are detailed description of the circuit in the above-mentioned embodiment. With reference to FIGS. 1 and 2, the AC/DC circuit 10 consists of a full-wave rectifier D1~D4.

The charging controller 60 includes a pulse width modulation (PWM) circuit 61, a sensor 62, an isolating controller 63, and a switch 64.

The PWM circuit 61 is connected to the AC/DC circuit 10 and the primary side 31 of the transformer 30 to control the DC current entering the primary side 31 of the transformer 30. When the entering DC current becomes larger, the voltage output by the secondary side 32 of the transformer 30 also becomes larger. In this embodiment, the PWM circuit 61 mainly includes a control IC U1. The control IC is connected to the AC/DC circuit 10 and the primary side 31 of the transformer 30.

The sensor 62 is connected to the secondary side 32 of the transformer 30 to detect the output voltage of the output interface 40. In this embodiment, the sensor 62 mainly includes first, second, third, and fourth resistors R17, R14, R18, R15, respectively. The resistors R17, R14, R18, and R15 are connected in series. The other end of the first resistor R17 is connected to the secondary side 32 of the transformer 30 and the output interface 40. The other end of the fourth resistor R15 is connected to the ground.

The isolating controller 63 is connected to the PWM circuit 61 via a receiving end 631, and to the sensor 62 via an emitting end 632. In this embodiment, the isolating controller 63 is a photo coupler. The equivalent light-emitting diode (LED) PH1A inside the photo coupler is connected to the emitting end 632 of the sensor 62. The equivalent phototransistor PH1B, on the other hand, is connected to the receiving end 631 of the PWM circuit 61.

The switch 64 is connected to the sensor 62 and the emitting end 632 of the isolating controller 63. In this embodiment, the switch 64 is a TL431 IC U11. Its anode A is connected to the ground, and its cathode K is connected to the negative electrode of the equivalent LED inside the photo coupler. Its reference electrode R is connected to the node K between the second and third resistors R14, R18.

The compensator 70 includes a diode D12, a capacitor C15, and fifth and sixth resistors R21, R20. The negative electrode of the diode D12 is connected to the secondary side 32 of the transformer 30. The capacitor C15 is connected between the positive terminal of the diode D12 and the ground. The fifth resistor R21 is connected between the diode D12 and the capacitor C15. The sixth resistors R20 is connected to the capacitor C15, the reference electrode of the TL431 IC U11, and the node K that connects the second and third resistors R14, R18.

When no battery 50 is connected to the output interface 40, the sensor 62 receives a high voltage output by the secondary side 32 of the transformer 30. Therefore, the voltage at the node K between the second and third resistors R14, R18 is also at a high level. The switch 64 is conductive, and the equivalent LED PH1A inside the photo coupler emits light. As a result, the equivalent phototransistor PH1B inside the photo coupler becomes conductive. Once the PWM circuit 61 detects that the equivalent phototransistor PH1B inside the photo coupler is conductive, it does not adjust the DC current entering the primary side 31 of the transformer 30. becomes conductive. Once the PWM circuit 61 detects that the equivalent LED PH1B inside the photo coupler is conductive, it does not adjust the DC current entering the primary side of the transformer 30.

When a battery 50 is connected to the output interface 40, the voltage on the output interface 40 is lowered because of the insufficient electrical power of the battery 50. The voltage at the node K is lowered to a low level, cutting off the switch 64. Once the switch 64 is cut off, the equivalent LED PH1A inside the photo coupler also cuts off without emitting light. The equivalent phototransistor PH1B inside the photo coupler therefore cuts off. In this case, the PWM circuit 61 detects that the equivalent phototransistor PH1B of the photo coupler is cut off. The DC current on the primary side 31 of the transformer 30 is increased until the voltage on the output interface 40 is elevated sufficiently high, so that the voltage on the node K can turn the switch 64 conductive. Therefore, the equivalent LED PH1A is conductive and emitting light, resulting in the conduction of the equivalent phototransistor PH1B of the photo coupler. In this case, the PWM circuit 61 detects that the equivalent phototransistor PH1B of the photo coupler is conductive. Thus, the PWM circuit 61 lowers the DC current sending into the primary side 31 of the transformer 30.

However, since the actual circuit has its resistance, some output voltage is wasted when the output voltage on the secondary side 32 of the transformer 30 is transmitted to the output interface 40. Therefore, the charging voltage imposed on the battery 50 is slightly lower than the voltage output from the secondary side 32 of the transformer 30. By connecting the negative terminal of the diode D12 of the compensator 70 to the secondary side 32 of the transformer 30, the invention can produce a negative voltage source on the positive terminal of the diode D12. The negative voltage source changes according to the magnitude of the output voltage from the secondary side 32 of the transformer 30. Therefore, when the battery 50 is connected to the output interface 40, resulting in a voltage drop on the node K, the negative voltage source further lowers the voltage on the node K. The control IC U1 has to control to send in a higher DC voltage to the primary side 31 of the transformer 30, further increasing the output voltage of the secondary side 32 of the transformer 30. This compensates for the electrical power wasted by the internal resistance of the actual circuit. Consequently, a larger voltage is imposed on the battery 50 for charging.

In summary, the invention can not only increase the voltage imposed on the battery, its compensator along with the charging controller can compensate the electrical power wasted by the circuit, maintaining satisfactory charging effects.

What is claimed is:

1. A charger with output voltage compensation, comprising:
   an AC/DC circuit connected to an AC source and converting an AC current to a DC current;
   a transformer having a primary side and a secondary side, the primary side connected to the AC/DC circuit to receive the DC current and the secondary side outputting an elevated voltage based on the DC current;
   an output interface connected to the secondary side of the transformer for the connection of a battery and outputting the elevated voltage to charge the battery;
   a charging controller comprising:
      a pulse width modulation (PWM) circuit connected to the AC/DC circuit and the primary side of the transformer for controlling the magnitude of the DC current flowing to the primary side of the transformer;
      a sensor connected to the secondary side of the transformer for detecting the magnitude of the elevated voltage of the output interface, and comprising a first, a second, a third and a fourth resistor sequentially connected in series, wherein an end of the first resistor is connected to the secondary side of the transformer, and the fourth resistor is connected to a ground;
      an isolating controller connected to the PWM circuit via a receiving end and connected to the sensor via an emitting end; and
      a switch connected to the sensor and the PWM circuit; wherein the output voltage detected by the sensor controls whether the switch should be turned on or off, and the DC current flowing to the primary side of the transformer is controlled by the PWM circuit along with the isolating controller; and
   a compensator connected to the secondary side of the transformer and the charging controller, said compensator comprising:
      a diode having a negative terminal and a positive terminal, the negative terminal connected to the secondary side of the transformer;

a capacitor connected between the positive terminal of the diode and the ground;

a fifth resistor connected between the diode and the capacitor; and a sixth resistor connected to the switch and connected to a node between the second and third resistors of the sensor;

wherein the elevated voltage is further increased by the charging controller to compensate for the energy wasted by the circuit when the battery is connected to the output interface.

2. The charger with output voltage compensation as claimed in claim 1, wherein the PWM circuit includes a control IC connected to the AC/DC circuit, the primary side of the transformer, and the receiving end of the isolating controller.

3. The charger with output voltage compensation as claimed in claim 1, wherein the isolating controller is a photo coupler having an equivalent light-emitting diode (LED) and a phototransistor, the equivalent light-emitting diode is connected to the emitting end of the sensor and the phototransistor is connected to the receiving end of the PWM circuit.

4. The charger with output voltage compensation as claimed in claim 1, wherein the switch is a TL431 IC having an anode, a cathode and a reference electrode, the anode is connected to the ground, the cathode is connected to the emitting end of the isolating controller, and the reference electrode is connected to the node between the second and third resistors.

5. The charger with output voltage compensation as claimed in claim 2, wherein the switch is a TL431 IC having an anode, a cathode and a reference electrode, the anode is connected to the ground, the cathode is connected to the emitting end of the isolating controller, and the reference electrode is connected to the node between the second and third resistors.

6. The charger with output voltage compensation as claimed in claim 3, wherein the switch is a TL431 IC having an anode, a cathode and a reference electrode, the anode is connected to the ground, the cathode is connected to the emitting end of the isolating controller, and the reference electrode is connected to the node between the second and third resistors.

7. The charger with output voltage compensation as claimed in claim 1, wherein the AC/DC circuit is a full-wave rectifier.

* * * * *